Figure 1:
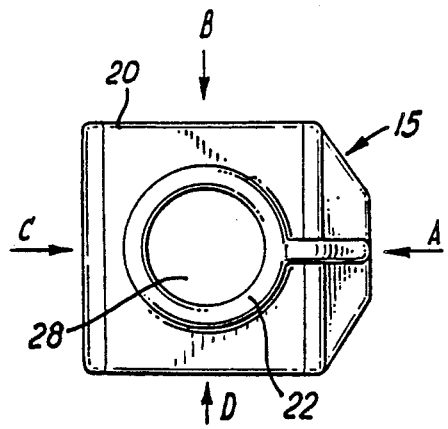

United States Patent [19]

Wilde

[11] Patent Number: 4,998,841
[45] Date of Patent: Mar. 12, 1991

[54] CLAMPS AND CLAMP ASSEMBLIES

[76] Inventor: Melvyn Wilde, Unit 1A, Empress Industrial Estate, Anderton Street, Wigan, England

[21] Appl. No.: 310,390

[22] Filed: Feb. 15, 1989

[30] Foreign Application Priority Data

Feb. 19, 1988 [GB] United Kingdom ............... 8803961
Sep. 8, 1988 [GB] United Kingdom ............... 8821099

[51] Int. Cl.$^5$ .............................................. F16B 7/10
[52] U.S. Cl. .................................. 403/104; 403/395; 403/400; 403/347; 403/362
[58] Field of Search ............... 403/347, 362, 373, 104, 403/396, 395, 400, 59

[56] References Cited

U.S. PATENT DOCUMENTS

| 1,367,644 | 2/1921 | Varner | 403/347 |
| 2,670,917 | 3/1954 | Hoffman | 403/347 X |
| 3,535,751 | 10/1970 | Batchelor | 403/395 X |
| 3,574,364 | 4/1971 | Langren | 403/395 |
| 3,825,358 | 7/1974 | Eisenhardt et al. | 403/362 X |
| 3,849,008 | 11/1974 | Boucher et al. | 403/104 |
| 3,908,330 | 9/1975 | Frach et al. | 403/362 X |
| 4,417,744 | 11/1983 | Spear | 403/104 X |
| 4,641,992 | 2/1987 | Patroni | 403/347 X |
| 4,850,560 | 7/1989 | Ross | 403/347 X |

FOREIGN PATENT DOCUMENTS

| 0160230 | 4/1985 | European Pat. Off. |
| 547701 | 9/1942 | United Kingdom |
| 668378 | 1/1950 | United Kingdom |
| 897376 | 5/1962 | United Kingdom |
| 1564113 | 8/1975 | United Kingdom |
| 1582664 | 8/1977 | United Kingdom |
| 2067646 | 1/1980 | United Kingdom |

Primary Examiner—Peter M. Cuomo
Assistant Examiner—Carol I. Bordas

[57] ABSTRACT

A clamp 10 comprises a moulded plastics hollow member 11 for receiving a first elongate member 13. The member 11 has external bosses 22 on two opposed sides defining aligned apertures which receive a second elongate member 30 which extends through the member 13. The member 13 can be solid with a bore for member 30 or hollow with apertures in opposed sides. One wall of the member has external ribs 18 and a recess in its inner surface in which is a nut in threaded engagement with a stem 23 of a clamp knob 24 so that the member 30 can be clamped between the inner end of the stem 23 and edges of opposed walls of the member 13. The member 11 can have a through bore for member 13 so as to be movable along it.

13 Claims, 3 Drawing Sheets

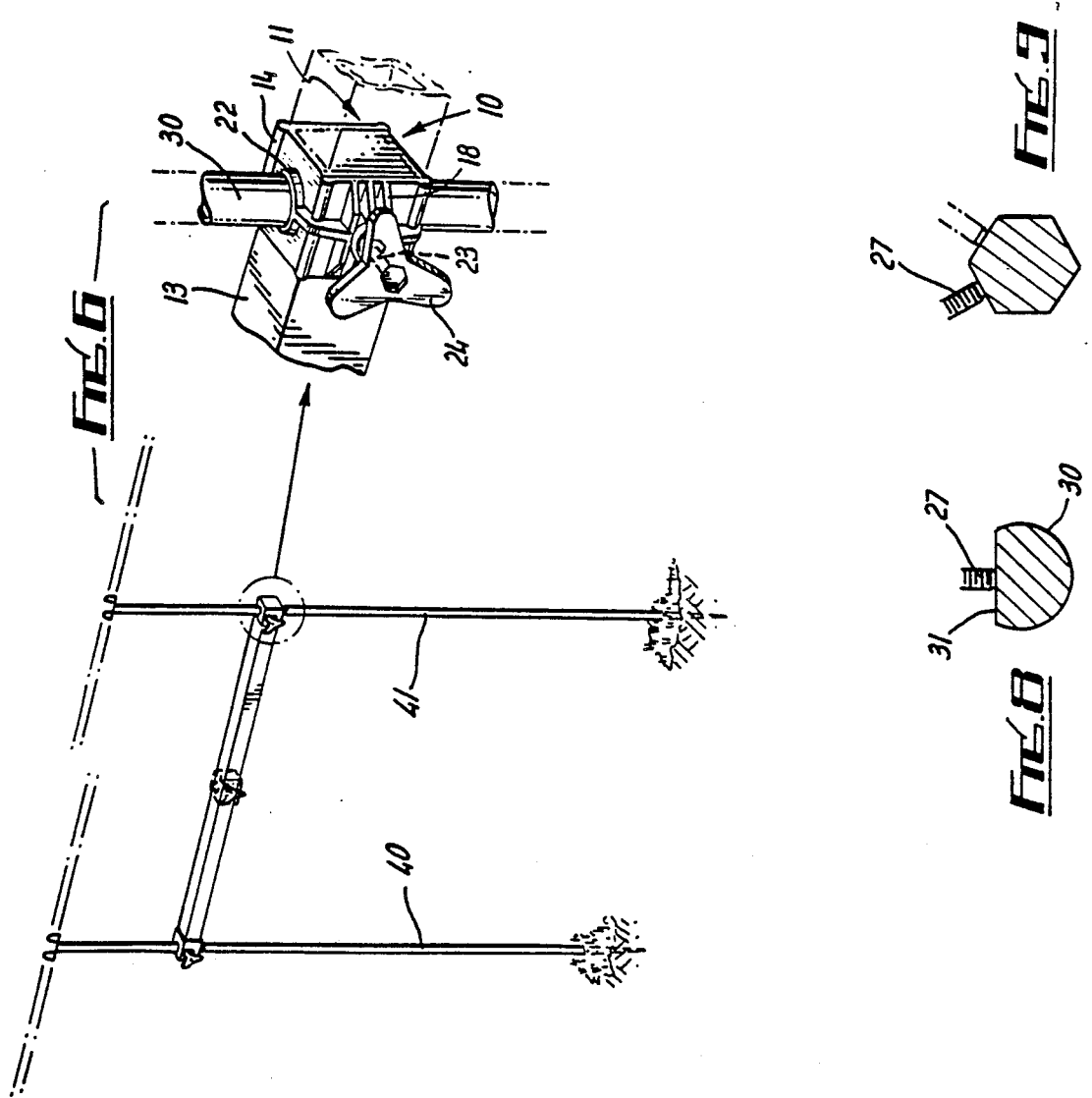

CLAMPS AND CLAMP ASSEMBLIES

This invention relates to clamps and clamp assemblies.

According to this invention a clamp comprises a hollow member having wall structure defining an aperture for receipt of a first elongate member, the hollow member having aperture means in opposed walls for receipt of a second elongate member extending through the aperture means and through and transverse to the first elongate member, and a rotatable clamp element in threaded engagement with the hollow member for clamping engagement with the second elongate member.

The clamp may include an internally threaded nut associated with a wall of the hollow member and engageable by the rotatable clamp element. The nut may be mounted in an internal recess in said wall. The nut may have a non-circular periphery received in a complementary shaped recess. The hollow member may have an external boss in the region of the clamp element. There may be a further wall structure spaced from the wall structure and defining an aperture so that further said first elongate member may extend through the further aperture and thus through the hollow member.

The hollow member may have two pairs of opposed walls, an aperture in a further wall for receipt of a first elongate member, aligned apertures in one pair of opposed walls for receipt of a second elongate member extending through the first elongate member, an internally threaded nut mounted in a recess of one of the other pair of opposed walls, and a rotatable clamp element in threaded engagement with the nut for clamping the second elongate member against the first elongate member.

The hollow member may be of plastics.

The invention includes a clamp assembly comprising a clamp as above with said first elongate member received in the hollow member and the second elongate member extending through the first elongate member.

Also according to the invention a clamp assembly comprises a hollow member, a first elongate member received in the hollow member, a second elongate member extending through the hollow member and through the first elongate member transverse to the first elongate member, and a rotatable clamp element for clamping the second elongate member. In one form the clamp element clamps the second elongate member against the first elongate member.

The first elongate member may be hollow and have apertures in spaced walls through which the second elongate member extends in engagement with the walls.

There may be an internally threaded nut received in an internal recess in the hollow member and in threaded engagement with the clamp element.

The first and second elongate members and the clamp element may be mutually orthogonal.

Figure 2:
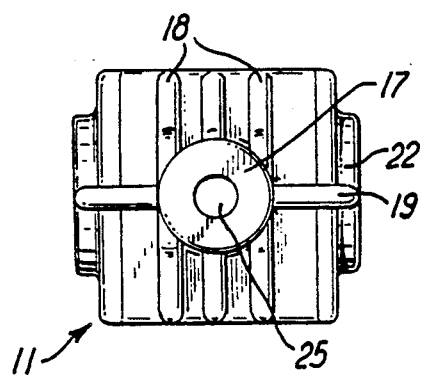
Figure 3:
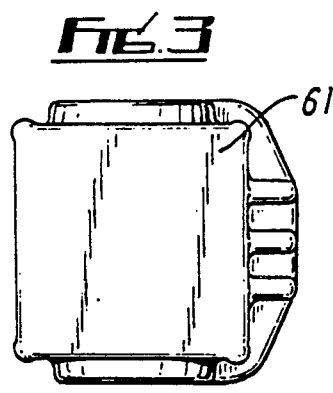
Figure 4:
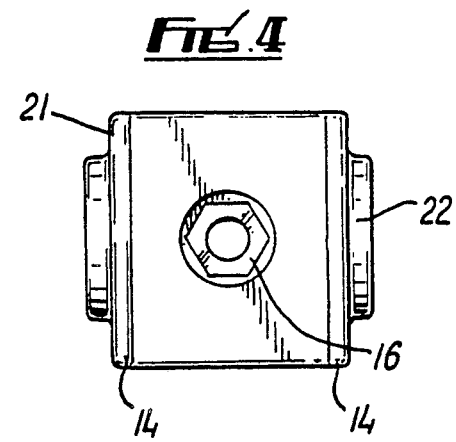
Figure 5:
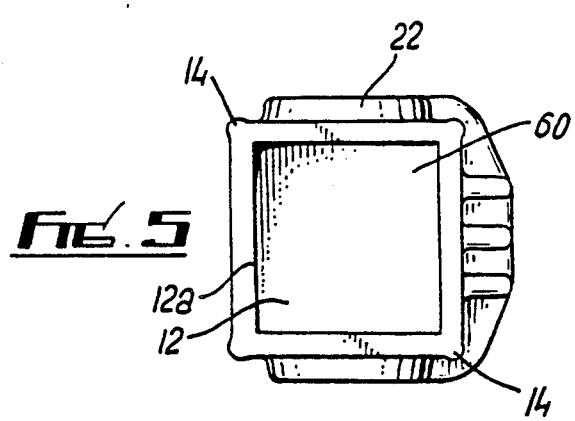
Figure 10:
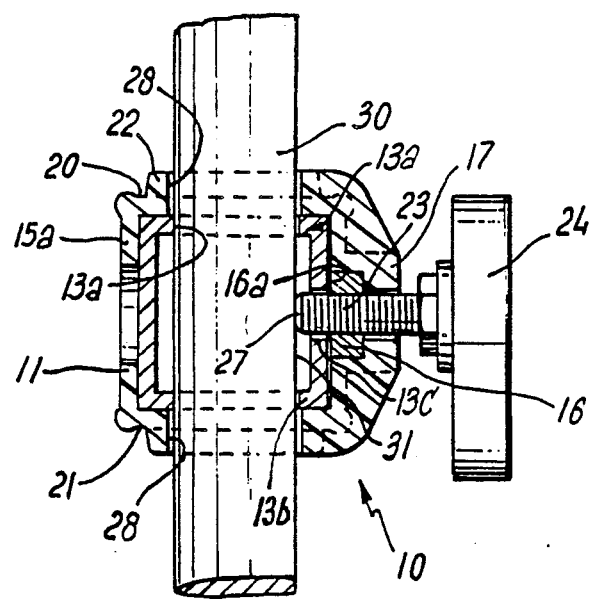

The invention may be performed in various ways and one specific embodiment with possible modifications will now be described by way of example with reference to the accompanying drawings, in which:

FIG. 1 is a top plan view of an end cap;
FIG. 2 is a view on line A of FIG. 1;
FIG. 3 is a view on line B of FIG. 1;
FIG. 4 is a view on line C of FIG. 1;
FIG. 4 is a view on line C of FIG. 1;
FIG. 5 is a view on line D of FIG. 1;
FIG. 6 is a perspective view of a stand;
FIG. 7 is a perspective view of another stand;
FIGS. 8 and 9 are sections across elongate rods; and
FIG. 10 is a section through a clamp assembly.

A clamp device 10 comprises a moulded plastics hollow end cap 11 which is generally square in section with two pairs of opposed walls 15, 15a and 20, 21, and has a mouth 12a leading to a recess or hollow interior 12 for receipt of an end of an elongate member 13 e.g. of metal. As shown, the member 13 is of square section and the inner surface of the recess 12 is a reasonably close fit on the member 13 so that the cap 11 can readily be slid on and off the member 13. The member 13 can be solid but as shown is a hollow tube with open ends. The cap 11 has four strengthening edge beads 14 and in the inner surface of one side 15 of the interior 12 has a hexagonal recess 16a to receive an internally threaded hexagonal metal nut 16 which is a firm fit in the recess 16a. An external boss 17 is formed on the side 15 and is provided with integral strengthening ribs 18 one of which 19 extends over sides 20, 21 to external circular bosses 22 on walls 20, 21.

The boss 17 has a central aperture 25 so that a threaded stem 23 e.g. of metal extending from a clamp knob 24 can extend through the aperture 25 into threaded engagement with the nut 16 and have an inner end 27 in the interior 12. The bosses 22 and sides 20, 21 are provided with aligned apertures 28.

In use, a bore 13a is formed in the member 13 to provide aligned apertures in opposed walls 13a, 13b so that when the cap 11 is in place on the member 13 an elongate rod 30 or the like e.g. of metal can extend through the bore 13a in the member 13 and through the apertures 28 transverse to the member 13. The rod 30 is provided with a flat surface 31 for engagement by end 27 (FIG. 8) so that rotation of the knob 24 will tighten the clamp and hold the members 13, 30 in position relative to each other. In the clamped condition FIG. 10 the rod 30 is spaced from the peripheries of the apertures 28 and is held in metal to metal contact between opposed walls of 13a, 13b of the member 13 and the stem end 27 to provide a three-point clamp grip. The members 13, 30 and 23 are mutually orthogonal.

The ribs 18, 19 help to resist deformation of the cap 11 on tightening of the clamp knob 24.

The member 13 is provided with a cross bore 13c, or recess, to permit entry of the stem 23.

It will be understood that reaction forces on the stem during tightening and when clamped are taken on the nut thread which is less liable to lead to damage than if the nut were absent and the aperture 25 in the plastics had an internal thread engaging the stem. The reaction forces are transferred through the nut to an area on the inner face of the recess 16a receiving the nut.

In a modification the hollow member 10 is die cast and the bore 25 is internally threaded, or the nut 16 is secured to the member, not necessarily in a recess.

In a modification the recess 16a for the nut 16 is in the inner face 60 FIG. 5 of a further cap wall 61 facing the mouth 12a and the ribs 18, 19 and boss 17 are on the outer face of the wall 61.

The clamp can be used to form support assemblies e.g. in FIG. 6 two clamps 10 connect a cross member 13 to two bank sticks 40, 41 for fishing. The sticks may be pointed at one end for digging into the ground and have a rubber or plastics ferrule 42 at the other end so that the sticks can be reversed in the clamps (FIG. 7) for use on hard ground. In FIG. 7 four clamps 10 are used to support a frame 44 and it will be understood that the sticks can be adjusted in their clamps to accommodate uneven ground whilst keeping the frame horizontal. The frame 44 could support or be part of a fishing box (seat) and a further clamp 10 could connect a foot rest to one of the sticks.

The clamp is not restricted to use in fishing and a variety of stands can be made by using clamps 10 to connect elongate members.

The rod 30 may have a local flat 31 or may be D-section. Other sections are possible. For example in FIG. 9 rod 30 is hexagon section and can thus be adjusted angularly relative to the member 13.

Rod 30 could be of circular cross-section. The end 27 of stem 23 is flat.

The end wall 61 can be omitted to provide a further aperture so that the member 13 can extend through the clamp as shown chain-dotted in FIG. 6 and in this case the clamp 10 can be adjustably moved to a desired position along the member 13.

The clamp may be used in a stand assembly.

I claim:

1. A clamp comprising a hollow member having wall structure defining an aperture for receipt of a first elongate member, the hollow member having opposed walls with aperture means in said opposed walls for receipt of a second elongate member extending through the aperture means and through and transverse to the first elongate member, and a rotatable clamp element in threaded engagement with the hollow member for clamping engagement with the second elongate member, wherein said aperture means permit transverse relative movement between the second elongate member and the opposed walls toward and away from each other, and said rotatable element when in clamping engagement with the second elongate member urges the second elongate member into contact with the first elongate member.

2. A clamp as claimed in claim 1, the hollow member including an internally threaded nut associated with a wall of the hollow member and engageable by the rotatable clamp element, the rotatable clamp element being clear of threaded engagement with said wall of the hollow member.

3. A clamp as claimed in claim 2, in which the nut is mounted in an internal recess in said wall.

4. A clamp as claimed in claim 2, in which the nut has a non-circular periphery received in a complementary shaped recess.

5. A clamp as claimed in claim 1, in which the hollow member has an external boss in the region of the clamp element.

6. A clamp as claimed in claim 1, including further wall structure spaced from the wall structure and defining a further aperture so that said first elongate member may extend through the further aperture and thus through the hollow member.

7. A clamp as claimed in claim 1, said hollow member having two pairs of opposed walls, said aperture being in a further wall for receipt of the first elongate member, said aperture means comprising aligned apertures in one pair of opposed walls for receipt of the second elongate member extending through the first elongate member, an internally threaded nut mounted in a recess of one of the other pair of opposed walls, said rotatable clamp element being in threaded engagement with the nut for clamping the second elongate member against the first elongate member and the first elongate member against the other of the other pair of opposed walls.

8. A clamp as claimed in claim 1, in which the hollow member is formed of plastics.

9. A clamp assembly comprising a clamp as claimed in claim 1, said first elongate member received in the hollow member and said second elongate member extending through the first elongate member, the rotatable element holding the second elongate member in contact with the first elongate member.

10. A clamp as claimed in claim 1 in which the rotatable clamp element urges the first elongate member against a wall of said hollow member facing the clamp element.

11. A clamp assembly comprising a hollow member having wall structure defining an aperture for receipt of a first elongate member, said first elongate member received in the hollow member, the hollow member having opposed walls with aperture means in said opposed walls for receipt of a second elongate member, said second elongate member extending through the aperture means of the hollow member and through the first elongate member transverse to the first elongate member, said aperture means permitting transverse relative movement between the second elongate member and the opposed walls toward and away from each other, and a rotatable clamp element in threaded engagement with the hollow member and in clamping engagement with the second elongate member for urging the second elongate member into clamping engagement with the first elongate member and the first elongate member into clamping engagement with the hollow member.

12. A clamp assembly as claimed in claim 11, in which the first elongate member is hollow and has apertures in opposed walls through which the second elongate member extends in engagement with the opposed walls of the first elongate member.

13. A clamp assembly as claimed in claim 11, including an internally threaded nut received in an internal recess in the hollow member and in threaded engagement with the clamp element, the clamp element being otherwise free from threaded engagement with the hollow member.

* * * * *